United States Patent [19]
Német

[11] 3,893,508
[45] July 8, 1975

[54] PRESSURE VESSEL
[75] Inventor: Josef Német, Badenwein, Austria
[73] Assignee: Reaktorbau Forschungs- und Baugesellschaft m.b.H. & Co. OHG, Seibersdorf, Austria
[22] Filed: July 26, 1972
[21] Appl. No.: 275,326

[30] Foreign Application Priority Data
July 30, 1971 Austria .................... A 6661/71

[52] U.S. Cl. .............................. 165/136; 165/162
[51] Int. Cl. ........................................... F28f 13/00
[58] Field of Search .......... 165/134, 135, 136, 169, 165/47, 162

[56] References Cited
UNITED STATES PATENTS
3,164,529 1/1965 Waine et al. ...................... 165/162
3,293,139 12/1966 Bellier .............................. 165/134
3,443,631 5/1969 Bremer et al. ..................... 165/134

Primary Examiner—Charles Sukalo
Attorney, Agent, or Firm—Woodhams, Blanchard and Flynn

[57] ABSTRACT

A pressure vessel whose wall comprises an outer supporting pre-stressed concrete wall member, a sealing skin made of highly heat-resistant material and disposed on the inside of the wall of the pressure vessel to seal the medium contained in the latter, and a thermal insulating layer which is disposed between and in force transmitting relationship with the prestressed concrete wall member and the sealing skin, the wall of the pressure vessel containing at least one temperature adjustment system.

11 Claims, 1 Drawing Figure

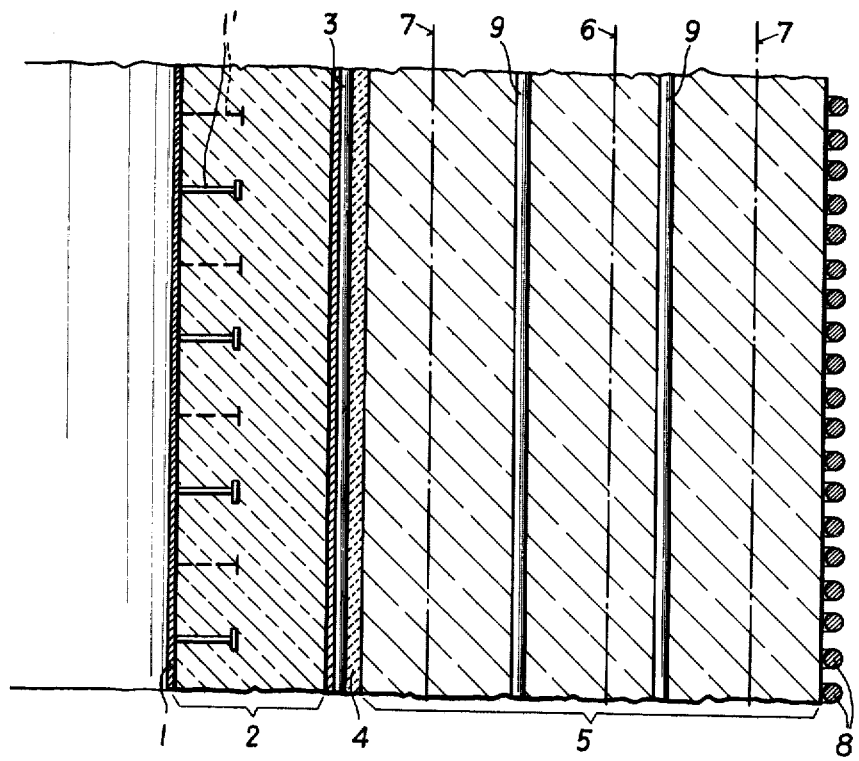

PRESSURE VESSEL

BACKGROUND OF THE INVENTION

The invention relates to a pressure vessel and, although the invention is not so restricted, it is more particularly concerned with a pressure vessel for receiving nuclear power station components.

It is known to dispose nuclear power station components, for example nuclear power station reactors, in pressure vessels of prestressed concrete. It is also known to provide these prestressed concrete vessels with a lining of sheet steel for sealing purposes. Since the prestressed concrete must be kept at a low temperature of about 50°–60°C thermal insulation is disposed inside the steel sealing skin (or liner) in order to protect the concrete from the high temperature of the reactor coolant. At the same time, in order to avoid excessive shrinkage stresses, the steel sealing skin must also be protected against this temperature. For this purpose, apart from the thermal insulating layer applied on the inside of the steel sealing skin, there must be provided on the outside of the steel sealing skin (i.e. on the side facing the concrete) a cooling system with the aid of which the necessary reduction of temperature is effected. With this hitherto customary arrangement, the reactor coolant passes through the thermal insulating layer, but the steel sealing skin remains cold (70°–90°C).

A first known vessel construction of cylindrical shape contains the following cylindrical layers from inside to outside:

1. Thermal insulation, for example by means of high-grade steel elements or by means of concrete, through which the reactor coolant passes;
2. Steel sealing skin, which is cold;
3. Cooling system disposed on the outside of the steel sealing skin;
4. Prestressed reinforced concrete wall.

In a second known vessel construction, the thermal insulation is disposed between two impermeable steel layers. Between the thermal insulation and the steel sealing skin of the prestressed concrete vessel a gap is disposed which is filled with a hydraulic medium and which is in pressure equilibrium with the pressurised reactor coolant. In the case of this second construction, the sealing skin and prestressed concrete envelope likewise remain cold, since cooling is effected in the hydraulic intermediate medium. In the case of this second construction, the thermal insulation does not have the reactor coolant pass therethrough, but is under hydraulic pressure on all sides.

A reactor as in the second construction consists of the following layers from inside to outside:

1. Sealing skin I (inner shell of the thermal shield and thermal insulation);
2. Thermal shield, for example of special concrete;
3. Thermal insulating material;
4. Sealing skin II (outer shell of thermal shield and thermal insulation);
5. Hydraulic medium serving as coolant;
6. Sealing skin III (actual steel sealing skin of the prestressed concrete wall);
7. Prestressed reinforced concrete wall.

Both constructions have a number of disadvantages. Thus, the actual sealing skin is covered by the internal thermal insulation and so is inaccessible to inspection. In addition, the danger exists that defects in the thermal insulation will give rise to so-called hot spots and consequently shrinkage stresses in the sealing skin lying behind the insulation, or in the prestressed concrete, so that these parts, which are not designed for such loads, will be overstressed.

Finally, in the second construction, three sealing skins are actually required, the two inner sealing skins being able to be displaced in relation to the outer sealing skin as the result of thermal expansions, which makes it extremely difficult or impossible for pipes to be passed through them radially. In the case of reactors this leads to the disadvantage that all pipes must be taken through the top or bottom of the vessel. Furthermore, the thermal insulation situated inside the pressure chamber is very expensive.

SUMMARY OF THE INVENTION

According to the present invention, there is provided a pressure vessel whose wall comprises an outer supporting pre-stressed concrete wall member, a sealing skin made of highly heat-resistant material and disposed on the inside of the wall of the pressure vessel so as to seal the medium contained in the latter, and a thermal insulating layer which is disposed between and in force transmitting relationship with the prestressed concrete wall member and the sealing skin, the wall of the pressure vessel containing at least one cooling and-/or heating system.

Thus the disadvantages indicated are overcome according to the invention by making the sealing skin of highly heat-resistant material and disposing it on the inside of the container wall, while the thermal insulating layer is disposed between and bears forcibly against the sealing skin and the prestressed concrete wall member.

A preferred example of construction of a pressure vessel according to the invention comprises the following features:

1. No thermal insulation is disposed on the inside of the actual sealing skin, since the construction of a pressure vessel according to the present invention is of itself sufficient to eliminate the disadvantages in respect of safety and economy.
2. The pressure chamber of the vessel is closed by a sealing skin which is exposed to the high internal temperature of the pressurised medium, for example gas or water, and therefore must be made of a highly heat-resistant material (hot sealing skin). The sealing skin is supported on a highly heat-resistant, pressure-transmitting thermal insulating layer, in which it may also be anchored.
3. In the region of the thermal insulating layer, or on its outer edges, a cooling system is disposed which reduces the temperature to the level permissible for the prestressed concrete. The temperature drop occurs mainly in the thermal insulating layer.
4. The cooling system disposed on the outer edge of the thermal insulating layer may also be used as a heating system. It may be fastened on a sheet metal shell, which ensures better temperature equalisation and optionally may be in the form of a second sealing skin.
5. The thermal insulating layer is supported on the prestressed concrete wall member which surrounds the thermal insulating layer and takes the internal pressure transmitted to it.

6. When the pressure vessel is of cylindrical construction, the two end closures of the vessel may in principle be similar in construction to the cylindrical wall.
7. The prestressed concrete wall member contains at least one additional cooling system, which for example is in the form of pipes through which liquid flows and which can also be used as a heating system. With the aid of this system the temperature in the prestressed concrete wall member and the temperature drop through the container wall can be controlled and adapted to operating requirements. In particular, through an increase of the temperature of the prestressed concrete wall member beyond the value customary hitherto, the shrinkage stresses occurring in the sealing skin can be reduced.
8. Through the increased operating temperature of the pre-stressed concrete wall member the drying-out of the latter is accelerated, plastic changes of shape die down far more quickly, and the vessel reaches a stable condition very much sooner.

This fundamentally different solution of the problem posed — elimination of internally situated thermal insulation and consequently the elimination of risks, control of temperatures of the prestressed concrete wall member, and stabilisation of the properties of the concrete — provides a number of technical and economic advantages, construction is simpler, and the thermal insulation is separated from the pressure medium. Since in liquid cooled reactors the insulating effect of the insulating layer would be reduced far too much in consequence of the high thermal conductivity of the cooling medium, and since in addition the insulating layer would be very liable to the risk of corrosion because of the very large reaction surface resulting from porosity, in liquid cooled reactors the separation of the cooling medium from the thermal insulation is indispensable; the sealing skin can be inspected at any time, it is not subject to any unforeseen, impermissible heating, and the cooling and heating systems are so disposed and designed that all operating conditions are kept under control. Both temperature and temperature gradient are controlled, the concrete dries out more quickly and its behaviour is more stable. The tensioning elements can remain unbonded, so that tensioning losses are balanced and tensioning elements can be replaced if required.

BRIEF DESCRIPTION OF THE DRAWING

The invention is illustrated, merely by way of example, in the accompanying drawing, which is a sectional view of part of a wall of a pressure vessel for nuclear reactors.

DESCRIPTION OF THE PREFERRED EMBODIMENT

Referring to the drawing, the wall of a pressure vessel for high internal pressures and high temperatures and for receiving nuclear power station components, is provided at its inside with a sealing skin or layer 1. The sealing skin 1, which consits of a highly heat-resistant steel alloy is able to withstand the temperatures occurring in the reactor, serves to seal the medium contained in the latter. On its outer side the sealing skin 1 has extensions 1' which are T-shaped and which serve to anchor it in an adjoining thermal insulating concrete layer 2. The thermal insulating layer 2 which is preferably formed from pressure-resistant, porous ceramic aggregate of expanded clay, has adequate strength to have a pressure transmitting effect. In the outward direction it is followed by a cooling zone 3, which is constructed in the form of a so-called cooling skin. That is to say it consists of a pipe system 3 which is fastened on a cylindrical sheet metal body (not shown) with the object of providing a better distribution of temperature over the entire surface. The cooling zone 3 is disposed on the surface of the thermal insulating layer 2, although it could be disposed within the latter. The cooling zone 3 may, if desired, be secured to a second sheet steel, sealing skin (not shown).

In the outward direction the cooling skin 3 is followed by an outer, supporting prestressed concrete wall member 5, the thermal insulating layer 2 being disposed between and in force transmitting relationship with the sealing skin 1 and the pre-stressed concrete wall member 5. The latter must be able to take the internal pressure of the reactor. For this purpose, the prestressed concrete wall member, has reinforcements 6 and 7, which consist partly of axially extending prestressing steel rods and partly of spirally disposed prestressing steel rods.

In the interior of the prestressed concrete wall member, there are disposed two heating and/or cooling systems 9 which consist of pipes through which a cooling liquid or, if necessary, a heating liquid flows, this liquid serving to adjust the temperature of the prestressed concrete wall member 5 to operating requirements, or to permit control of the temperature gradient and in particular to reduce the shrinkage stress in the sealing skin by controlling the mean temperature of the prestressed concrete wall member 5. An annular pretensioning reinforcement 8 is also provided on the outside.

Since the insulating concrete layer 2 together with the sealing skin 1 and cooling skin 3 on the one hand and the prestressed concrete wall member 5 on the other hand can be made separately and then joined together, an open gap is first left between these two parts which is then filled by injected concrete mortar 4. The pretensioning elements 6, 7 may be movably mounted in the prestressed concrete wall member 5 and thus, after the changes in the concrete or after relaxation of the pretensioning elements, they can be re-tensioned or replaced.

We claim:
1. A pressure vessel for use in containing a high pressure, high temperature fluid medium, comprising:
an inner steel sealing layer having a high heat-resistant characteristic;
an outer supporting, prestressed concrete, layer encircling said inner sealing layer and being spaced from said inner sealing layer to define a space therebetween;
thermal insulating and pressure transmitting layer means positioned between said inner sealing layer and said outer supporting layer, said insulating layer means being free of expansion joints and made of a material which has a higher heat insulative characteristic than said outer support layer, said insulating and pressure-transmitting layer means continuously and directly engaging said inner sealing layer over the entire interface; and at least one temperature control system for controlling the temperature in at least one of said insulating layer means and said outer supporting layer.

2. A pressure vessel according to claim 1, wherein said at least one temperature control system is mounted on said thermal insulating layer.

3. A pressure vessel according to claim 2, wherein said temperature control system is a cooling system which is disposed on said interface of said thermal insulating layer and said outer supporting layer.

4. A pressure vessel according to claim 1, wherein said at least one temperature control system is mounted on said outer supporting concrete layer.

5. A pressure vessel according to claim 4, wherein said temperature control system is a pipe system adapted to be fed with a liquid.

6. A pressure vessel according to claim 1, wherein said prestressed concrete layer includes reinforcing means for reinforcing said outer supporting layer, said reinforcing means consisting of axially extending and spiral prestressing elements.

7. A pressure vessel according to claim 6, wherein at least some of said prestressing elements include means for supporting same for movement in said outer supporting layer.

8. A pressure vessel according to claim 1, wherein said sealing layer is anchored in said thermal insulating layer means by means of T-shaped ties.

9. A pressure vessel according to claim 1, wherein said thermal insulating layer is formed from a pressure-resistant porous ceramic aggregate.

10. A pressure vessel for use in containing a high pressure, high temperature fluid medium, comprising:
an inner steel sealing layer having a high heat resistant characteristic, said sealing layer means including tie means projecting radially outwardly therefrom;
a thermal insulating and pressure transmitting concrete layer mounted on the radially outer side of said sealing layer and having said tie means embedded therein, said insulating and pressure transmitting layer engaging said sealing layer continuously and directly over the entire interface;
an outer supporting, prestressed concrete layer adapted to absorb the high pressures transmitted to it from the interior of said pressure vessel;
first temperature control means for evenly distributing the heat in said insulating and pressure transmitting layer adjacent the interface between said insulating and pressure transmitting concrete layer and outer supporting layer; and
second temperature control means for controlling the temperature in said outer supporting layer.

11. A pressure vessel according to claim 10, including means defining a gap between said insulating and pressure transmitting concrete layer and said outer supporting layer, said gap being filled with an injected concrete mortar thereby facilitating a separate manufacture of said insulating and pressure transmitting concrete layer and said outer supporting layer.

* * * * *